W. QUEENAN & C. FARWELL.
SELF LOCKING PIN FOR BRAKE SUSPENSIONS.
APPLICATION FILED MAR. 7, 1916.
1,196,978.
Patented Sept. 5, 1916.
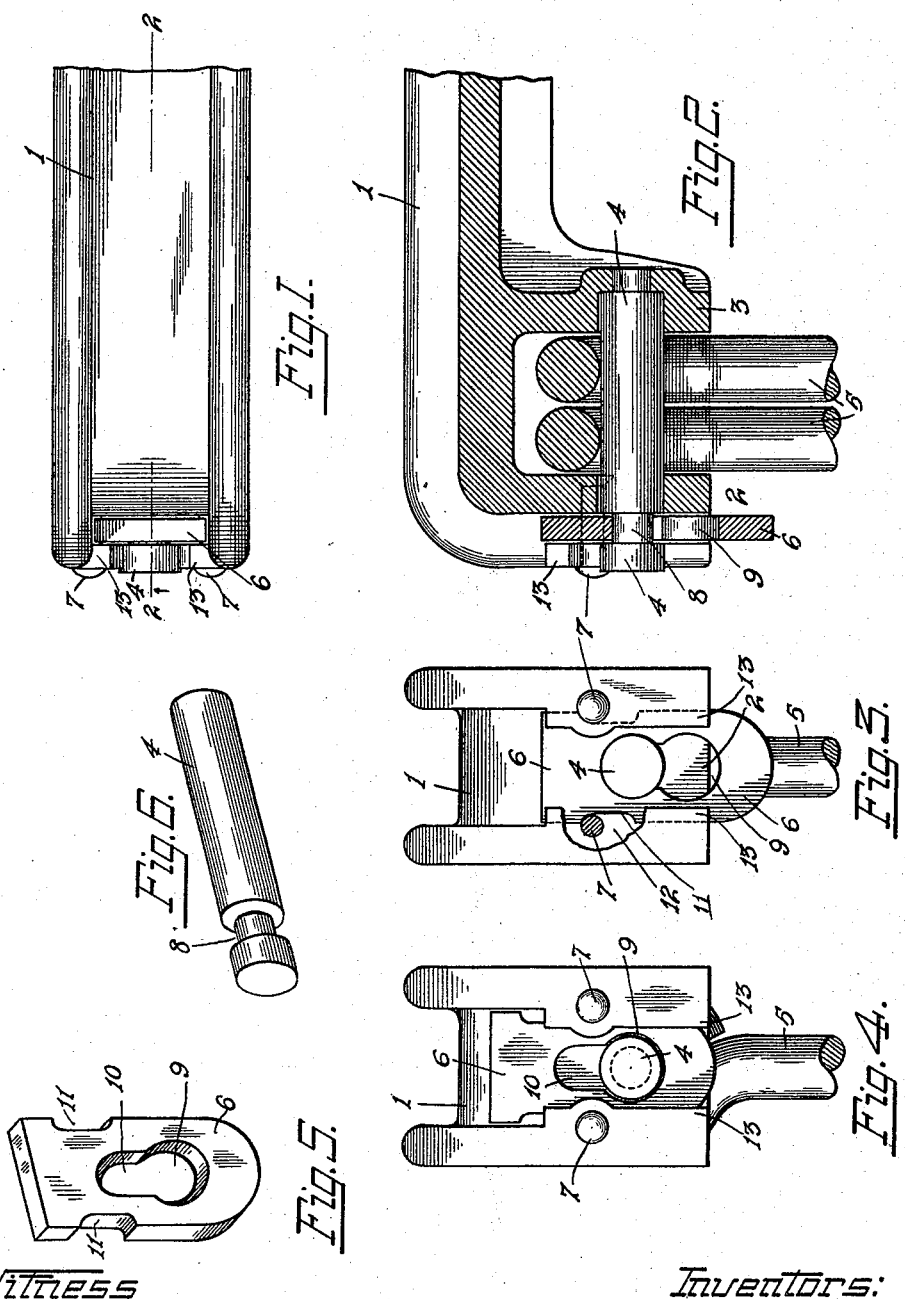

UNITED STATES PATENT OFFICE.

WILLIAM QUEENAN AND CHARLES FARWELL, OF AURORA, ILLINOIS.

SELF-LOCKING PIN FOR BRAKE SUSPENSIONS.

1,196,978. Specification of Letters Patent. Patented Sept. 5, 1916.

Application filed March 7, 1916. Serial No. 82,547.

*To all whom it may concern:*

Be it known that we, WILLIAM QUEENAN and CHARLES FARWELL, both citizens of the United States, residing at Aurora, in the county of Kane and State of Illinois, have jointly invented certain new and useful Improvements in Self-Locking Pins for Brake Suspensions, of which the following is a full, clear, concise, and exact description, reference being had to the accompanying drawings, forming a part of this specification.

Our invention relates to self locking pins and has to do more particularly with self locking pins carried by the brake hanger bracket for supporting the brake hanger in brake suspensions. The usual method of supporting the brake hanger on railway cars is to provide an ordinary pin with cotter or split key which pin extends through holes in the brake hanger bracket and supports the brake hanger, but it is found that frequently the workmen will fail to apply the cotter or spread same sufficiently and the cotter will work out during the operation of the cars, which will allow the pin to jar out of the bracket, thus permitting the brake beam to drop down upon the rails, resulting in a derailment of the train.

One of the objects of the present invention is to provide an automatic lock which acts when the brake hanger pin is inserted and automatically locks the pin in position, the preferred structure being such that no cotter key is required for the pin.

For a better understanding of our invention, reference will be had to the accompanying drawing in which:

Figure 1 is a top view of one end of a brake hanger bracket; Fig. 2 is a sectional view along the line 2—2 of Fig. 1; Fig. 3 is an end view of Fig. 2, with the locking plate in its locking position; Fig. 4 is a similar view, but with the locking plate moved upwardly into its unlocking position; Fig. 5 is a perspective view of the locking plate; and Fig. 6 is a perspective view of the brake hanger pin.

Referring now more particularly to the preferred form of our invention, we provide a brake hanger bracket 1 of which one end only is shown, having extensions 2 and 3 provided with bearings for supporting the brake hanger pin 4 which projects beyond the bearing in extension 2 and is provided preferably with an annular groove 8, adapted to be engaged by the locking plate 6. Said brake hanger pin 4 supports a hanger 5.

The locking plate 6 has a free vertical movement, being carried back of the overhanging lugs 13. The locking plate is provided with a locking portion 10 adapted to coöperate with the groove 8 to normally hold the pin in place. Said plate is also provided with an opening 9, slightly larger than the pin 4, so as to allow the insertion and removal of the pin 4 therethrough when the plate is raised to its unlocking position as shown in Fig. 4.

We preferably fix the plate in the bracket so that it cannot become lost, and in order to permit longitudinal movement of the plate from the locking to unlocking position, and vice versa, we provide a recess 11 along each side of the plate with pins 7 extending through these recesses as shown more particularly at the cut-away portion 12 of Fig. 3. Thus it will be seen that movement of the locking plate is permitted to the extent of the length of these recesses.

In the operation of the device, and assuming that it has been assembled as shown in Fig. 2, locking plate 6 is moved upwardly by hand until the locking portion 10 is free of the locking groove 8 in the pin as indicated in Fig. 4, when the said pin may be removed longitudinally from the bracket and the hanger permitted to drop. After the pin has been removed, the locking plate 6 will drop by gravity to the position shown in Fig. 3.

Assuming now that the parts are to be assembled, the hanger 5 is first placed between the extensions 2—3 of the bracket and the locking plate 6 moved upwardly to its unlocking position as shown in Fig. 4. The brake hanger pin 4 is then inserted in the bracket, and as it is moved inwardly, the locking portion 10 rides upon the pin until the groove 8 comes opposite the plate 6, when the plate will drop by gravity and the locking portion 10 enter the groove 8, and thus automatically lock the hanger pin in holding position.

Although in the preferred form of our invention it is applied to brake beam suspensions, we do not desire to be limited to this particular use as we contemplate applying our invention to other devices than that shown. Neither do we desire to be limited to the exact construction shown and described, as it will be apparent that various changes and modifications will readily occur to those skilled in the art, and therefore we aim to cover all that which comes within the spirit and scope of the appended claims.

Having thus described our invention what we claim as new and desire to secure by Letters Patent is:—

1. A device of the character described comprising a brake hanger bracket having a horizontal bearing with a seat at one end, a brake hanger pin longitudinally removable from the bearing and adapted to stop against the seat when inserted in the bearing, and a gravity locking plate slidingly carried by the bracket and adapted to drop over an outer locking end of the pin when inserted against the seat to normally prevent removal thereof.

2. A device of the character described comprising a brake hanger bracket, an annularly grooved pin longitudinally removable from the bracket, and a gravity locking plate, movably supported by the bracket and with an opening through which the pin is inserted in the bracket, said opening including a locking edge adapted to move downwardly with the plate to engage the groove to normally prevent removal of the pin when inserted in the bracket.

3. A device of the character described comprising a brake hanger bracket, a brake hanger pin longitudinally removable from the bracket, said pin being annularly grooved at an end projecting beyond the bracket, and a gravity locking plate movably supported by the bracket and provided with an opening through which the pin is inserted in the bracket, said opening including a locking edge adapted to move downwardly with the plate to engage the groove to normally prevent removal of the pin when inserted in the bracket, said locking plate being manually movable upwardly to disengage the locking edge from the groove to allow removal of the pin.

In witness whereof, we have hereunto subscribed our names.

WILLIAM QUEENAN.
CHARLES FARWELL.

Copies of this patent may be obtained for five cents each, by addressing the "Commissioner of Patents, Washington, D. C."